US008767858B2

(12) United States Patent
Kwon et al.

(10) Patent No.: US 8,767,858 B2
(45) Date of Patent: Jul. 1, 2014

(54) COMMUNICATION SYSTEM AND METHOD USING SPACE DIVISION MULTI-USER MULTIPLE INPUT MULTIPLE OUTPUT (SD-MIMO) COMMUNICATION METHOD

(75) Inventors: Ui Kun Kwon, Hwaseong-si (KR); Tae Rim Park, Seoul (KR); Young Soo Kim, Seoul (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 242 days.

(21) Appl. No.: 12/956,526

(22) Filed: Nov. 30, 2010

(65) Prior Publication Data

US 2011/0135023 A1    Jun. 9, 2011

(30) Foreign Application Priority Data

Dec. 4, 2009  (KR) ........................ 10-2009-0119859

(51) Int. Cl.
*H04B 7/02*    (2006.01)
(52) U.S. Cl.
USPC ........... 375/267; 375/260; 375/261; 375/262; 375/265; 375/340; 375/343; 375/346; 375/347; 375/350
(58) Field of Classification Search
CPC .. H04B 7/0617; H04B 7/0413; H04B 7/0417; H04B 7/0452; H04B 7/0639; H04B 7/024; H04B 7/0478; H04B 7/0634; H04B 7/0691; H04B 7/0695; H04B 7/086; H04B 17/006; H04B 17/0077; H04L 5/0023; H04L 5/0048; H04L 5/0051; H04L 5/0044; H04L 5/005; H04L 5/0094; H04L 25/03343; H04L 27/2626; H04L 27/2636; H04L 1/0606; H04L 1/0618; H04L 27/2601; H04L 5/0005; H04L 1/0004

USPC ......... 375/260, 286, 340, 262, 265, 267, 343, 375/346, 350; 370/203, 204, 205, 208, 209, 370/210; 455/132
See application file for complete search history.

(56) References Cited

U.S. PATENT DOCUMENTS 5,852,630 A * 12/1998 Langberg et al. ............. 375/219
7,269,430 B2   9/2007 Moorti et al.
(Continued)

FOREIGN PATENT DOCUMENTS

CN        101529738 A     9/2009
KR    10-2000-0015682     3/2000
(Continued)

OTHER PUBLICATIONS

International Search Report (Form PCT/ISA/210) issued on Aug. 26, 2011, in counterpart International Application No. PCT/KR2010/008616 (3 pages, in English).
(Continued)

*Primary Examiner* — Dhaval Patel
(74) *Attorney, Agent, or Firm* — NSIP Law

(57) ABSTRACT

Provided is a communication system using a space division multi-user multiple input multiple output (SD-MIMO) communication method. A transmission apparatus may transmit, to each of terminals included within a coverage, common control information commonly transmitted to the terminals and individual control information individually transmitted to each of the terminals. The transmission apparatus does not precode the common control information and transmits the non-precoded common control information. The transmission apparatus precodes the individual control information and transmits the precoded individual control information.

25 Claims, 12 Drawing Sheets

(56) References Cited

U.S. PATENT DOCUMENTS

| | | |
|---|---|---|
| 7,564,914 B2 | 7/2009 | Hansen et al. |
| 7,720,470 B2 * | 5/2010 | Shi et al. .................... 455/425 |
| 7,974,178 B2 * | 7/2011 | Lomnitz et al. ............. 370/208 |
| 2005/0113026 A1 | 5/2005 | Moorti et al. |
| 2007/0204052 A1 | 8/2007 | Trainin et al. |
| 2007/0223423 A1 | 9/2007 | Kim et al. |
| 2008/0212700 A1 * | 9/2008 | Han et al. .................... 375/260 |
| 2008/0212701 A1 | 9/2008 | Pan et al. |
| 2008/0225993 A1 * | 9/2008 | Malladi et al. .............. 375/340 |
| 2011/0096797 A1 | 4/2011 | Zhang et al. |
| 2011/0149942 A1 * | 6/2011 | Ko et al. ..................... 370/343 |
| 2011/0211539 A1 * | 9/2011 | Ko et al. ..................... 370/329 |

FOREIGN PATENT DOCUMENTS

| | | |
|---|---|---|
| KR | 10-2005-0049292 | 5/2005 |
| KR | 10-2005-0071362 | 7/2005 |
| KR | 10-2009-0042949 A | 5/2009 |
| WO | WO 01/10046 | 2/2001 |

OTHER PUBLICATIONS

Chinese Office Action issued May 8, 2014 in counterpart Chinese Patent Application No. 201080054977.1. (9 pages in Chinese).

* cited by examiner

COMMUNICATION SYSTEM AND METHOD USING SPACE DIVISION MULTI-USER MULTIPLE INPUT MULTIPLE OUTPUT (SD-MIMO) COMMUNICATION METHOD

CROSS-REFERENCE TO RELATED APPLICATION(S)

This application claims the benefit under 35 U.S.C. §119(a) of Korean Patent Application No. 10-2009-0119859, filed on Dec. 4, 2009, in the Korean Intellectual Property Office, the entire disclosure of which is incorporated herein by reference for all purposes.

BACKGROUND

1. Field

The following description relates to a method of transmitting and receiving data using a wireless network.

2. Description of Related Art

In a space division multi-user multiple input multiple output (SD-MIMO) communication method, precoding may correspond to a process of appropriately allocating spatial beams to users.

Multiple-input and multiple-output (MIMO) includes three main categories: precoding, spatial multiplexing or SM, and diversity coding. Beamforming increases the signal gain from constructive interference and reduces the multipath fading effect. When the receiver has multiple antennas, precoding is used to simultaneously maximize the signal level at the receiving antennas. In spatial multiplexing, a high rate signal is split into multiple lower rate streams, and each stream is transmitted from a different transmit antenna in the same frequency channel. In diversity coding, a single stream is coded using space-time coding and transmitted. Spatial multiplexing can also be combined with precoding or combined with diversity coding.

A transmission apparatus may receive channel status information from terminals, and may select a terminal to receive data using precoding based on the received channel status information. The transmission apparatus may perform precoding based on the channel status information.

A terminal may receive a training signal from the transmission apparatus, and estimate a channel between the transmission apparatus and the terminal using the received training signal to generate channel status information.

In the SD-MIMO communication method, the transmission apparatus may employ a plurality of transmit antennas and thus the channel between the transmission apparatus and the terminal may be provided in a vector or matrix form. To estimate the channel in the vector or matrix form, the transmission apparatus may transmit an individual training signal for each transmit antenna.

SUMMARY

A transmission apparatus to transmit data to a plurality of terminals comprising at least one receive antenna, the transmission apparatus comprising a common control information generator configured to generate common control information with respect to the plurality of terminals, an individual control information generator configured to generate individual control information with respect to each of the terminals, a precoder configured to generate precoded data with respect to each of the terminals by precoding the individual control information and data with respect to each of the terminals and a transmitter configured to transmit, to the plurality of terminals, a data frame comprising the common control information and the precoded data according to a multi-user multiple input multiple output (MU-MIMO) communication method.

The common control information comprises one or more of a precoding method applied to the data frame, a number of terminals supported by the data frame, a number of data streams included in the data frame, a duration or a length of a channel estimation field included in the data frame, and a format of the channel estimation field.

A power amplifier training signal generator configured to generate a power amplifier training signal for a multi-antenna automatic gain control (AGC) of each of the terminals, wherein the precoder is further configured to generate the precoded data by additionally precoding the power amplifier training signal.

The individual control information comprises one or more of a length of the data frame, a modulation and coding method applied to the data with respect to each of the terminals, a channel bandwidth, a channel smoothing, a channel aggregation, an error correction code, and a length of a guard interval.

A channel estimation signal generator configured to generate a channel estimation signal used for a channel estimation of each of the terminals, wherein the precoder is further configured to generate the precoded data by additionally precoding the channel estimation signal.

In one general aspect, there is provided a transmission apparatus to transmit data to a plurality of terminals including at least one receive antenna, the transmission apparatus including: a common control information generator configured to generate common control information with respect to the plurality of terminals, an individual control information generator configured to generate individual control information with respect to each of the terminals, a precoder configured to generate precoded data with respect to each of the terminals by precoding the individual control information and data with respect to each of the terminals, and a transmitter configured to transmit, to the plurality of terminals, a data frame including the common control information and the precoded data according to a multi-user multiple input multiple output (MU-MIMO) communication method.

The transmission apparatus may include that the common control information includes one or more of: a precoding method applied to the data frame, a number of terminals supported by the data frame, a number of data streams included in the data frame, a duration or a length of a channel estimation field included in the data frame, and a format of the channel estimation field.

The transmission apparatus may further include including: a power amplifier training signal generator configured to generate a power amplifier training signal for a multi-antenna automatic gain control (AGC) of each of the terminals, wherein the precoder is further configured to generate the precoded data by additionally precoding the power amplifier training signal.

The transmission apparatus may include that the individual control information includes one or more of: a length of the data frame, a modulation and coding method applied to the data with respect to each of the terminals, a bandwidth of a using channel, a channel smoothing, a channel aggregation, an error correction code, and a length of a guard interval.

The transmission apparatus may further include: a channel estimation signal generator configured to generate a channel estimation signal used for a channel estimation of each of the terminals, wherein the precoder is further configured to generate the precoded data by additionally precoding the channel estimation signal.

The transmission apparatus may further include: a controller configured to: individually determine a number of data streams transmitted to each of the terminals, and determine a number of channel estimation signal groups based on the number of data streams, wherein the data frame includes a plurality of data streams, and wherein the channel estimation signal includes a plurality of channel estimation signal groups.

The transmission apparatus may include that: the transmitter is further configured to transmit a plurality of precoded data to a particular terminal included in the plurality of terminals, and each of channel estimation signals included in the plurality of precoded data is included in a different time interval.

The transmission apparatus may include that the individual control information is modulated using a predetermined modulation method, or is error correction coded using a predetermined error correction code method.

In another general aspect, there is provided a terminal connected to a transmission apparatus, the terminal including: a receiver configured to receive a data frame from the transmission apparatus, a common control information decoder configured to decode, from the data frame, common control information commonly transmitted to the terminal and to a second terminal that are connected to the transmission apparatus, an individual control information decoder configured to decode, from the data frame, individual control information individually determined with respect to each of the terminal and the second terminal based on the common control information, and a data decoder configured to decode data, included in the data frame, based on the individual control information, wherein the individual control information and the data are precoded and are received.

The terminal may include that the common control information includes one or more of: a precoding method applied to the data frame, a number of terminals supported by the data frame, a number of data streams included in the data frame, a duration or a length of a channel estimation field included in the data frame, and a format of the channel estimation field.

The terminal may include that the individual control information includes one or more of: a length of the data frame, a modulation and coding method applied to the data with respect to each of the terminals, a bandwidth of a using channel, a channel smoothing, a channel aggregation, an error correction code, and a length of a guard interval.

The terminal may include that the individual control information decoder is further configured to decode the individual control information using a predetermined modulation method or a predetermined error correction code method.

The terminal may further include: a channel estimator configured to estimate a channel between the terminal and the transmission apparatus based on a channel estimation signal, wherein the data frame includes the channel estimation signal, and wherein the data decoder is further configured to decode the data based on the estimated channel.

The terminal may include that: the data frame includes a plurality of data streams, each of the data streams includes the channel estimation signal, and the channel estimation signal included in each of the data streams is included in a different time interval.

The terminal may include that: the data frame includes a plurality of data streams, the channel estimation signal includes a plurality of channel estimation signal groups, and a number of the channel estimation signal groups is determined based on a number of the data streams.

The terminal may include that the receiver is further configured to receive the data frame via at least one receive antenna.

In another general aspect, there is provided a method of transmitting data to a plurality of terminals including at least one receive antenna, the method including: generating common control information with respect to the plurality of terminals, generating individual control information with respect to each of the terminals, generating precoded data with respect to each of the terminals by precoding the individual control information and data with respect to each of the terminals, and transmitting, to the plurality of terminals, a data frame including the common control information and the precoded data according to a MU-MIMO communication method.

The method may include that the common control information includes one or more of: a precoding method applied to the data frame, a number of terminals supported by the data frame, a number of data streams included in the data frame, a duration or a length of a channel estimation field included in the data frame, and a format of the channel estimation field.

The method may include that the individual control information includes one or more of: a length of the data frame, a modulation and coding method applied to the data with respect to each of the terminals, a bandwidth of a using channel, a channel smoothing, a channel aggregation, an error correction code, and a length of a guard interval.

The method may further include: generating a channel estimation signal used for a channel estimation of each of the terminals, wherein the precoding includes generating the precoded data by additionally precoding the channel estimation signal.

In another general aspect, there is provided a method of receiving data, the method including: receiving a data frame from the transmission apparatus, decoding, from the data frame, common control information commonly transmitted to the terminal and to a second terminal that are connected to the transmission apparatus, decoding, from the data frame, individual control information individually determined with respect to each of the terminal and the second terminal based on the common control information, and decoding data, included in the data frame, based on the individual control information, wherein the individual control information and the data are precoded and are received.

The method may further include: estimating a channel between the terminal and the transmission apparatus based on a channel estimation signal, wherein the data frame includes the channel estimation signal, and the decoding of the data includes decoding the data based on the estimated channel.

The method may include that: the data frame includes a plurality of data streams, each of the data streams includes the channel estimation signal, and the channel estimation signal included in each of the data streams is included in a different time interval.

In another general aspect, there is provided a non-transitory computer-readable recording medium storing a program to implement the method of claim 17.

Other features and aspects will be apparent from the following detailed description, the drawings, and the claims.

Figure 1:
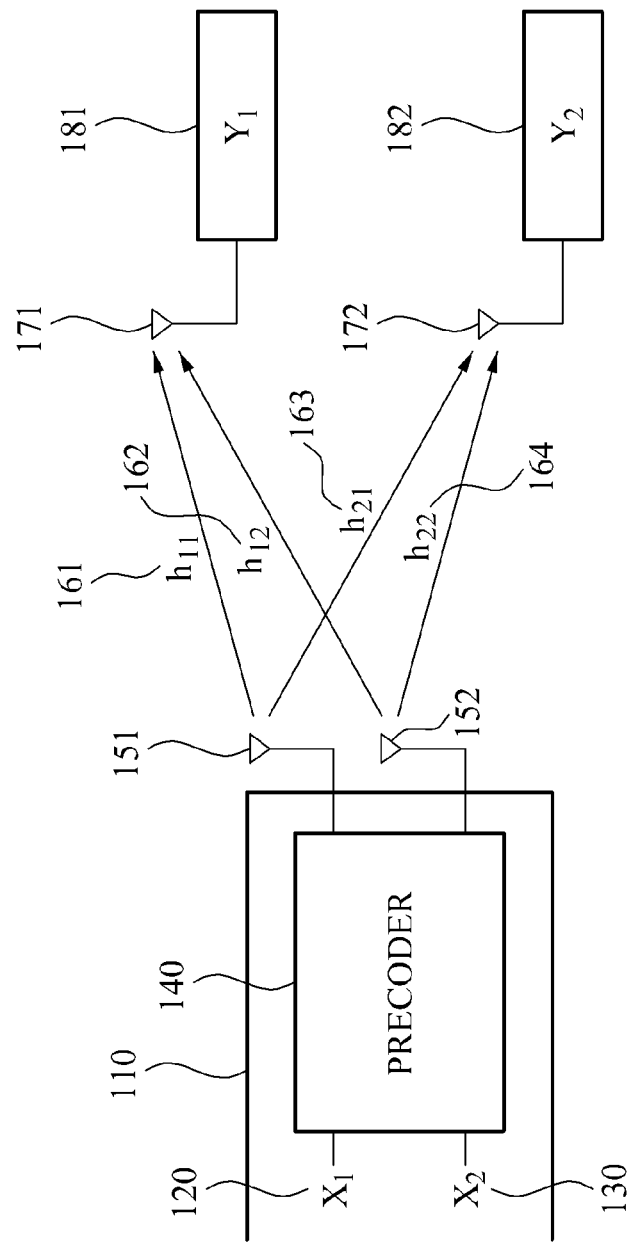
FIG. 1 is a diagram illustrating a data transmission using a multi-user multiple input multiple output (MU-MIMO) communication method according to an embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a data transmission using a multi-user multiple input multiple output (MU-MIMO) communication method according to an embodiment.

Referring to FIG. 1, a transmission apparatus 110 transmits data to terminals 181 and 182 via transmit antennas 151 and 152. A precoder 140 of the transmission apparatus 110 may precode data streams 120 and 130 using a precoding matrix.

The precoded data streams may be transmitted to the terminals 181 and 182 using vector channels 161, 162, 163, and 164. Although the illustrated terminal 181 includes a single receive antenna 171 and the terminal 182 includes a single receive antenna 172 in FIG. 1, each of the terminals 181 and 182 may include a plurality of receive antennas.

Each of the terminals 181 and 182 may receive the data streams transmitted using the vector channels 161, 162, 163, and 164. A signal received by the terminal 181 may be expressed by the following Equation 1.

$$[y_1] = [h_{11} \ h_{12}] \cdot \begin{bmatrix} t_{11} \\ t_{21} \end{bmatrix} \cdot [x_1] + [h_{11} \ h_{12}] \cdot \begin{bmatrix} t_{12} \\ t_{22} \end{bmatrix} \cdot [x_2] + [n_1] \quad \text{[Equation 1]}$$

A signal received by the terminal 182 may be expressed by the following Equation 2.

$$[y_2] = [h_{21} \ h_{22}] \cdot \begin{bmatrix} t_{11} \\ t_{21} \end{bmatrix} \cdot [x_1] + [h_{21} \ h_{22}] \cdot \begin{bmatrix} t_{12} \\ t_{22} \end{bmatrix} \cdot [x_2] + [n_2] \quad \text{[Equation 2]}$$

In one example, $x_1$ and $x_2$ denote the data streams to be transmitted from the transmission apparatus 110 to the terminals 181 and 182, respectively; $y_1$ and $y_2$ denote the signals received by the terminals 181 and 182, respectively; and $h_{11}$, $h_{12}$, $h_{21}$, and $h_{22}$ denote statuses of radio channels formed between each of the transmit antennas 151 and 152 and each of the receive antennas 171 and 172. Also, $[t_{11}, t_{21}]$ denotes a precoding vector of the terminal 181, $[t_{12}, t_{22}]$ denotes a precoding vector of the terminal 182, and $n_1$ and $n_2$ denote thermal noise.

Referring to the above Equation 1, the transmission apparatus 110 may determine the precoding vector $[t_{12}, t_{22}]$ such that an inner product value of a channel vector $[h_{11} \ h_{12}]$ with respect to the terminal 181 and the precoding vector $[t_{12}, t_{22}]$ with respect to the terminal 182 may become a very small value. In one example, interference of the data stream $x_2$ against the terminal 181 may decrease.

Similarly, referring to the above Equation 2, the transmission apparatus may determine the precoding vector $[t_{11}, t_{21}]$ such that an inner product value of a channel vector $[h_{21} \ h_{22}]$ with respect to the terminal 182 and the precoding vector $[t_{11}, t_{21}]$ with respect to the terminal 181 may become a very small value. In one example, interference of the data stream $x_1$ against the terminal 182 may decrease.

The transmission apparatus 110 may receive channel status information from each of the terminals 181 and 182 to verify the channel status information, and may determine a precoding vector so that a channel vector and the precoding vector may mutually have a small inner product value.

When the transmission apparatus 110 transmits, to the terminals 181 and 182, a data frame including a first data frame and a second data frame, a length of the second data frame received by the terminal 181 may be very short. Accordingly, an amount of interference caused by the second data stream may be very small and the terminal 181 may decode the first data stream. Similarly, the terminal 182 may decode the second data stream.

Each of the terminals 181 and 182 may receive a training signal from the transmission apparatus 110 to estimate a channel status using the training signal. As shown in FIG. 1, when the transmission apparatus 110 includes the plurality of transmit antennas 151 and 152, the transmission apparatus 110 may transmit a specially designed training signal to each of the terminals 181 and 182, such that each of the terminals 181 and 182 may identify the training signal transmitted from each of the transmit antennas 151 and 152.

Figure 2:
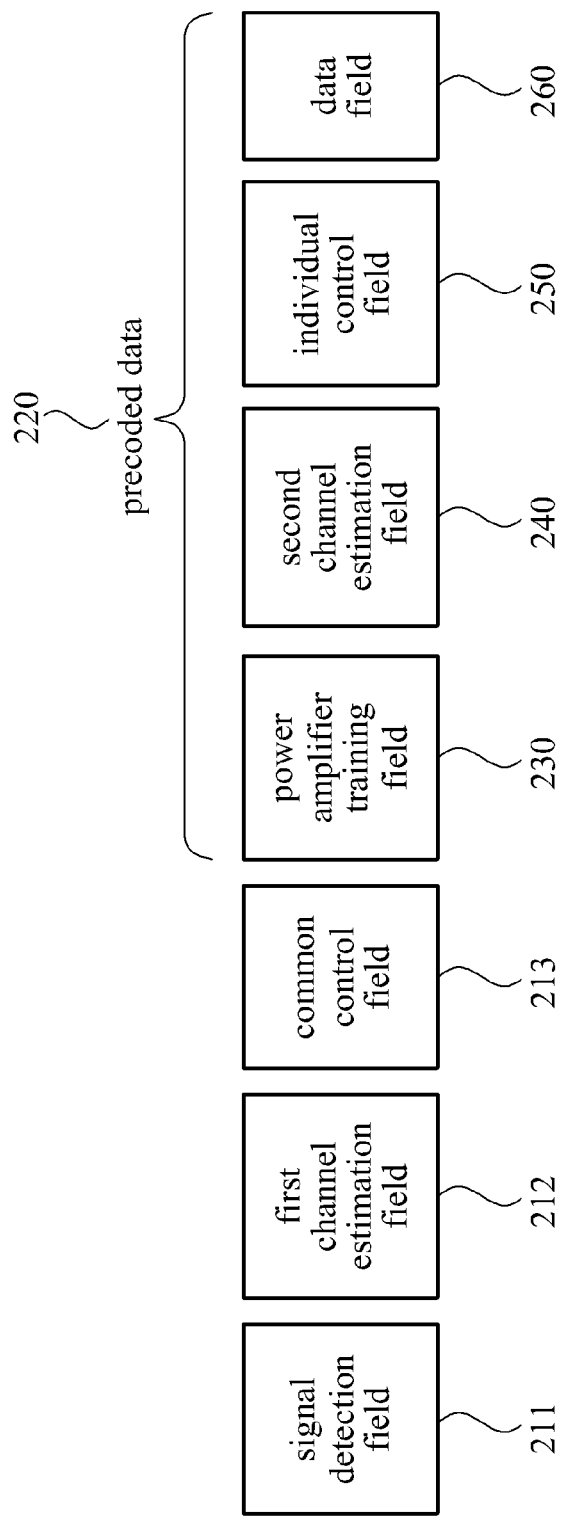
FIG. 2 is a diagram illustrating a structure of a data frame according to an embodiment.

FIG. 2 illustrates a structure of a data frame according to an embodiment. The data frame includes a signal detection field 211, a first channel estimation field 212, a common control field 213, and precoded data 220.

Precoding may not be applied to the signal detection field 211, the first channel estimation field 212, and the common control field 213.

The precoded data 220 corresponds to information that is precoded and may be transmitted to each terminal, e.g., the terminals 181 and 182 in FIG. 1. Accordingly, the precoded data 220 may include control information or data that is individually determined for each terminal. The precoded data 220 may include a power amplifier training field 230, a second channel estimation field 240, an individual control field 250, and a data field 260.

A terminal, e.g., the terminals 181 and 182, may detect a received frame using the signal detection field 211, and may set a gain value of a power amplifier. The terminal may also estimate a coarse time synchronization with respect to the received frame, and estimate a frequency offset.

The terminal may estimate a fine frequency offset using the first channel estimation field 212. The terminal may estimate a channel for decoding of a channel estimation field.

The terminal may detect common control information with respect to a data frame currently being transmitted using the common control field 213. The common control information may include one or more of: a precoding method applied to the data frame, a number of terminals supported by the data frame, a number of data frames included in the data frame, a duration or a length of the second channel estimation field 240, and a format of the second channel estimation field 240.

The power amplifier training field 230 may include a training signal to enhance a multi-antenna automatic gain control (AGC) performance. The terminal may set a fine gain value of a power amplifier appropriate for a precoded signal using the power amplifier training field 230.

The terminal may accurately estimate a channel for decoding of the precoded individual control field 250 and the data field 260 using the second channel estimation field 240.

The terminal may receive the individual control field 250 to detect individual control information of a data frame transmitted to each terminal. Control information corresponding to each terminal may be precoded and simultaneously be transmitted.

Individual control information may include one or more of: a length of the data field 260 or the data frame transmitted to a corresponding terminal, a modulation and coding method applied to the data field 260, a channel bandwidth, a channel smoothing, a channel aggregation, an error correction code, a length of a guard interval.

As described above, the information in the common control field 213 is not precoded while the information in the individual control field 250 is precoded. In other words, the information in the common control field 213 may be decoded by each terminal in the system, but the information included in the individual control field 250 may be decoded only by an intended terminal. As such, the type of information to be not precoded (and therefore to be decoded by each terminal) may be included in the common control field 213, and the type of information to be precoded (and therefore to be decoded only by an intended terminal) may be included in the individual control field 250. For example, a number of data frames included in the data frame, a duration or a length of the second channel estimation field 240 and a format of the second channel estimation field 240 described above as the information included in the common control field 213 may instead be included in the individual control field 250. Also, a length of the data field 260 or the data frame transmitted to a corresponding terminal, a modulation and coding method applied to the data field 260, a channel bandwidth, a channel smoothing, a channel aggregation, an error correction code and a length of a guard interval described above as the information included in the individual control field 250 may instead be included in the common control field 213.

Figure 3:
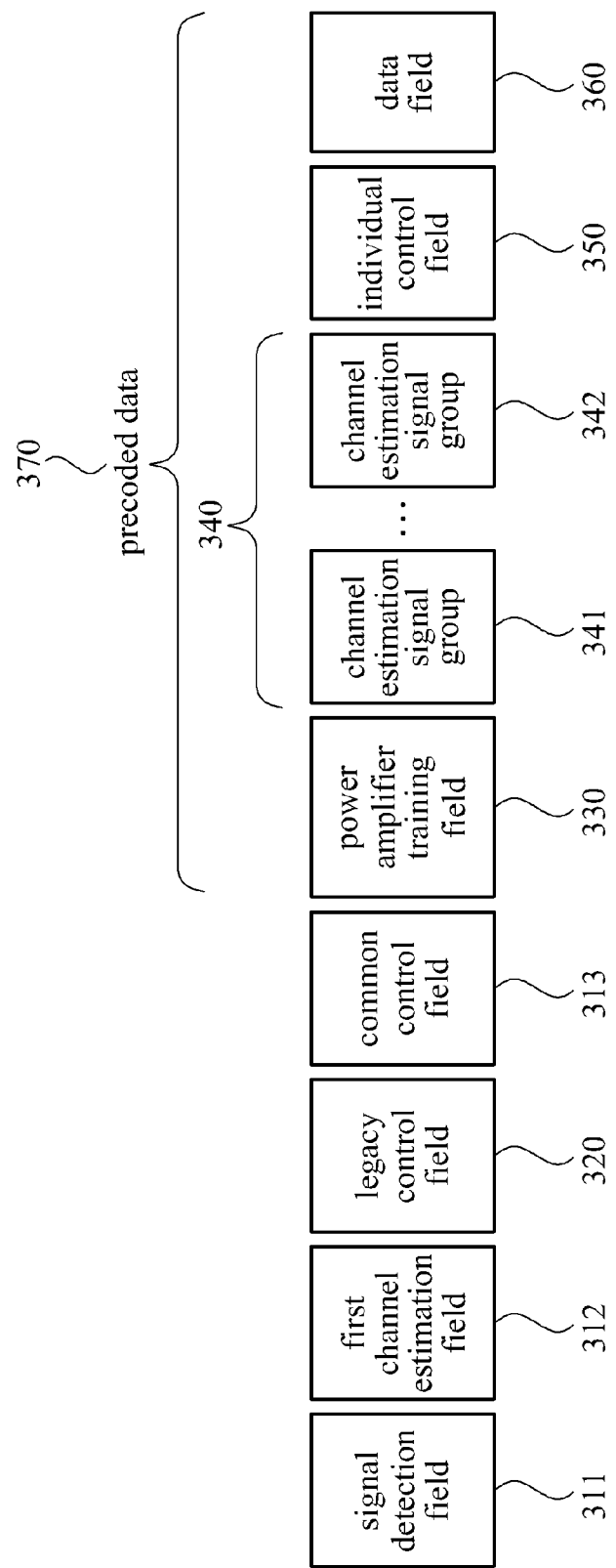
FIG. 3 is a diagram illustrating a structure of a data frame further including legacy control information to support terminals according to an embodiment.

FIG. 3 illustrates a structure of a data frame further including legacy control information to support terminals according to an embodiment.

Referring to FIG. 3, the data frame includes a signal detection field 311, a first channel estimation field 312, a legacy control field 320, a common control field 313, and precoded data 370.

Precoding is not applied to the signal detection field 311, the channel estimation field 312, and the common control field 313. In other words, it is not necessary to precode the signal detection field 311, the channel estimation field 312, and the common control field 313. Accordingly, as similar to the description made above with reference to FIG. 2, a terminal, e.g., terminals 181 and 182 in FIG. 1, supporting a space division multi-user multiple input multiple output (SD-MIMO) communication method may receive the signal detection field 311, the first channel estimation field 312, and the common control field 313 and use these fields to receive the precoded data 370.

Precoding is not applied to the legacy control field 320. In other words, it is not necessary to precode the legacy control field 320. Accordingly, an existing terminal not supporting the SD-MIMO communication method may also receive the legacy control field 320 using the signal detection field 311, the first channel estimation field 312, and the common control field 313. Using the legacy control field 320, the existing terminal may detect information associated with a modulation and coding method applied to a data field 360 and a frame length.

The existing terminal may verify a time interval in which the precoded data field 360 is transmitted and not receive the precoded data field 360.

The terminal supporting the SD-MIMO communication method may receive the precoded data field 360 using the common control field 313. The common control field 313 is similar to the common control field 213 of FIG. 2.

The precoded data 370 may include a power amplifier training field 330, a second channel estimation field 340, an individual control field 350, and the data field 360. The power amplifier training field 330, the individual control field 350, and the data field 360 of FIG. 3 are similar to the power amplifier training field 230, the individual control field 250, and the data field 260 of FIG. 2.

A terminal may estimate a channel between a transmission apparatus and the terminal using the second channel estimation field 340. The second channel estimation field 340 may include a plurality of channel estimation signal groups 341 and 342. The terminal may estimate the channel between the transmission apparatus and the terminal by combining the plurality of channel estimation signal groups 341 and 342.

When using the data frame of FIG. 3, an advanced terminal supporting the SD-MIMO communication method may receive the common control field 313 and even an existing terminal not supporting the SD-MIMO communication method may receive the legacy control field 320. The existing terminal may detect a length of the precoded data field 360 transmitted to the advanced terminal using the legacy control field 320 and then may terminate a reception.

Figure 4:
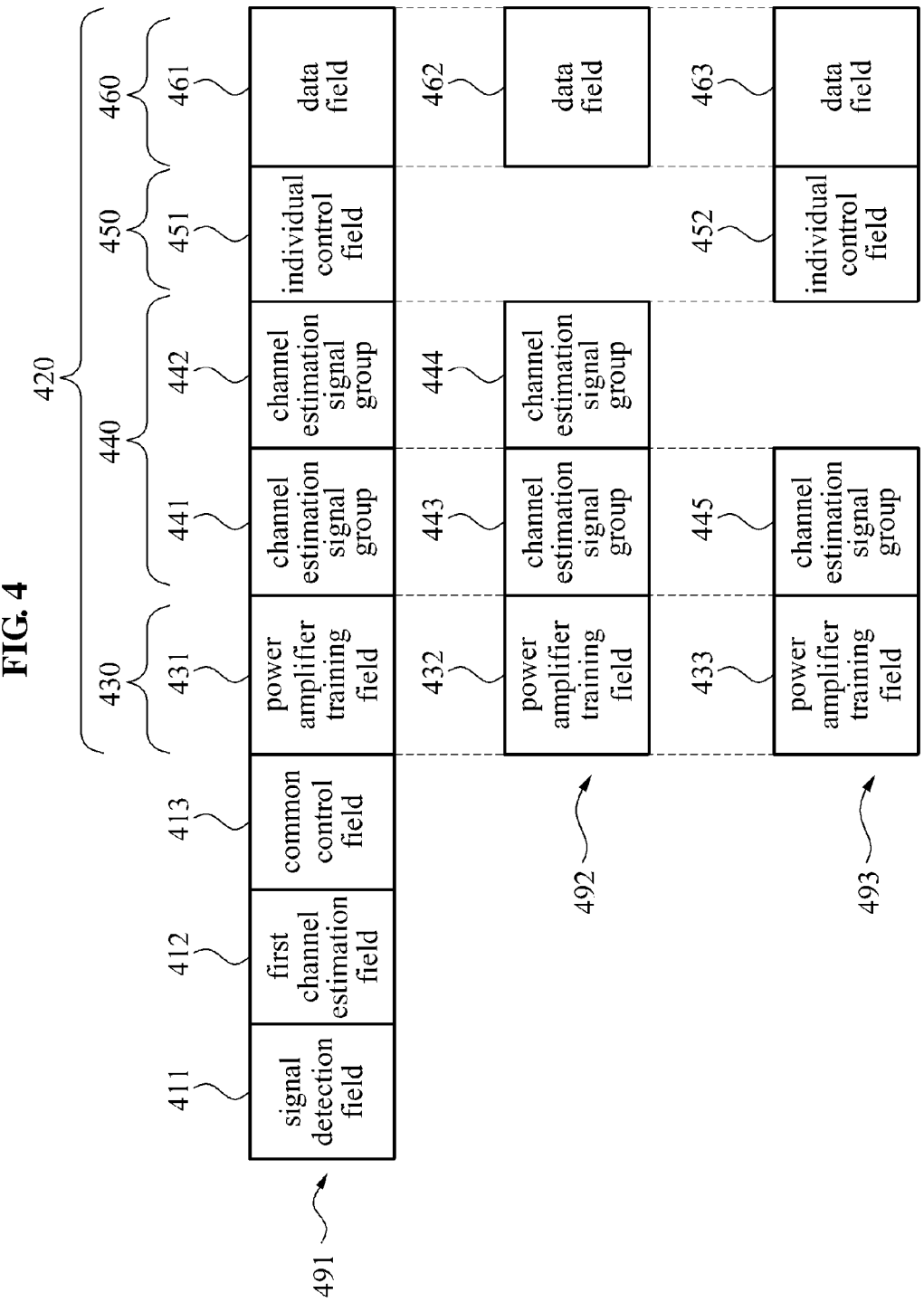
FIG. 4 is a diagram illustrating a data frame when a particular terminal receives a plurality of data streams according to an embodiment.

FIG. 4 illustrates a data frame when a particular terminal receives a plurality of data streams 491, 492, and 493 according to an embodiment.

Referring to FIG. 4, the data frame supports two terminals, for example, a first terminal and a second terminal, e.g., terminals 181 and 182 in FIG. 1. The data frame includes the plurality of data streams 491, 492, and 493. Among the data streams 491, 492, and 493, the data streams 491 and 492 may be transmitted to the first terminal, and the data stream 493 may be transmitted to the second terminal.

A signal detection field 411, a first channel estimation field 412, and a common control field 413 are not precoded and may be transmitted to each of the first terminal and the second terminal. The signal detection field 411, the first channel estimation field 412, and the common control field 413 of FIG. 4 include similar information to the signal detection field 211, the first channel estimation field 212, and the common control field 213 of FIG. 2.

Precoded data 420 is precoded with respect to the particular terminal and may be decoded only by the particular terminal to which it is directed. In one example, only the particular terminal would have the capability of decoding the precoded data 420. The precoded data 420 included in each of the data streams 491, 492, and 493 may include a power amplifier training field 430, a second channel estimation field 440, an individual control field 450, and a data field 460.

The first terminal may decode precoded data 431, 441, 442, 451, and 461 included in the data stream 491. The first terminal may also decode precoded data 432, 443, 444, and 462 included in the data frame 492. The second terminal may decode precoded data 433, 445, 452, and 463 included in the data stream 493.

The power amplifier training field 430 is precoded and transmitted to each of the first terminal and the second terminal. The power amplifier training field 430 of FIG. 4 is similar to the power amplifier training field 230 of FIG. 2.

The second channel estimation field 440 included in each of the data streams 491, 492, and 493 may include at least one of channel estimation signal groups 441, 442, 443, 444, and 445.

A number of channel estimation signal groups included in each of the data streams 491, 492, and 493 may be determined based on a number of data streams to be transmitted to each of the first terminal and the second terminal. In other words, there may be one channel estimation group for each respective data stream to be transmitted.

For example, when two data streams 491 and 492 are transmitted to the first terminal, the data stream 491 may include at least two channel estimation signal groups, e.g., the channel estimation signal groups 441 and 442; and the data stream 492 may include at least two channel estimation signal groups, e.g., the channel estimation group 443 and 444.

When only the single data stream 493 is transmitted to the second terminal, the data stream 493 may include a single channel estimation signal group, e.g., the channel estimation signal group 445.

The first terminal receiving the data streams 491 and 492 may estimate a channel between a plurality of transmit antennas and the first terminal by combining the channel estimation signal groups 441, 442, 443, and 444. In other words, all of the channel estimation groups in each received stream, e.g., data streams 491 and 492 in the illustrated example, may be used to estimate the channel.

The second terminal receiving the single data stream 493 may estimate a channel between a transmit antenna and the second terminal using only the channel estimation signal group 445. Again, all of the channel estimation groups in each received stream, e.g., data stream 493 by itself, in the illustrated example, may be used to estimate the channel.

Individual control information included in each of individual control fields 451 and 452 includes information similar to the individual control information included in the individual control field 250 of FIG. 2.

Each of the first terminal and the second terminal may be aware of a number of data streams transmitted to a corresponding terminal based on the individual control information. The individual control information may keep track of how many data streams are transmitted. Each of the first terminal and the second terminal may be aware of the number of channel estimation signal groups included in each data stream based on the number of data streams transmitted to each of the first terminal and the second terminal. The individual control information may keep track of how many channel estimation signal groups are included.

Each of the first terminal and the second terminal may estimate a channel using a corresponding channel estimation signal group. The first and second terminals may also decode data fields 461, 462, and 463 transmitted to each of the first terminal and the second terminal.

In FIG. 4, two terminals, e.g., terminals 181 and 182, may receive data frames. According to another embodiment, a single terminal or at least three terminals may receive data frames. In one example, a number of channel estimation signal groups included in the second channel estimation field 440 may be determined based on a number of data streams received by each terminal.

Figure 5:
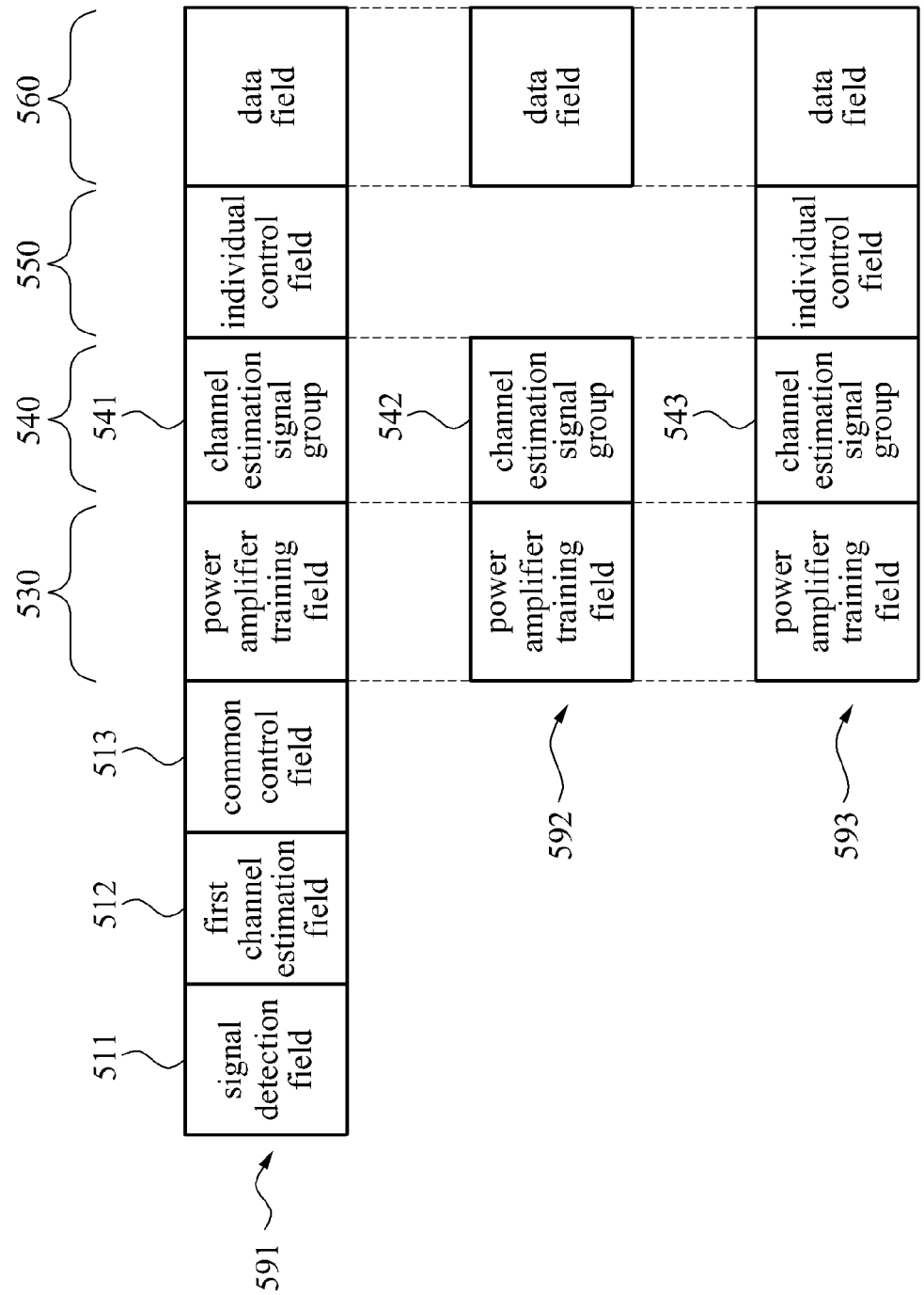
FIG. 5 is a diagram illustrating an example of a data frame in which data streams are independently separated and transmitted using precoding

FIG. 5 illustrates an example of a data frame in which data streams are independently separated and transmitted using precoding.

Referring to FIG. 5, the data frame may include three data streams 591, 592, and 593 in order to support two terminals, for example, a first terminal and a second terminal. The data streams 591 and 592 may be transmitted to the first terminal, and the data stream 593 may be transmitted to the second terminal.

A second channel estimation field 540 included in each of the data streams 591, 592, and 593 may include channel estimation signal groups 541, 542, and 543 in the same time interval. When the data streams 591, 592, and 593 are independently separated and transmitted, each of the first terminal and the second terminal may estimate a channel between a base station and each of the first terminal and the second terminal based on the simultaneously transmitted channel estimation signal groups 541, 542, and 543.

A signal detection field 511, a first channel estimation field 512, a common control field 513, a power amplifier training field 530, an individual control field 550, and a data field 560 of FIG. 5 are configured to be similar to the description made above for similar items with reference to FIGS. 2 through 4.

In FIG. 5 two terminals receiving data frames were described. According to another embodiment, a single terminal or at least three terminals may receive data frames. In one example, the channel estimation signal groups 541, 542, and 543 included in the second channel estimation field 540 may be included in the same time interval.

Figure 6:
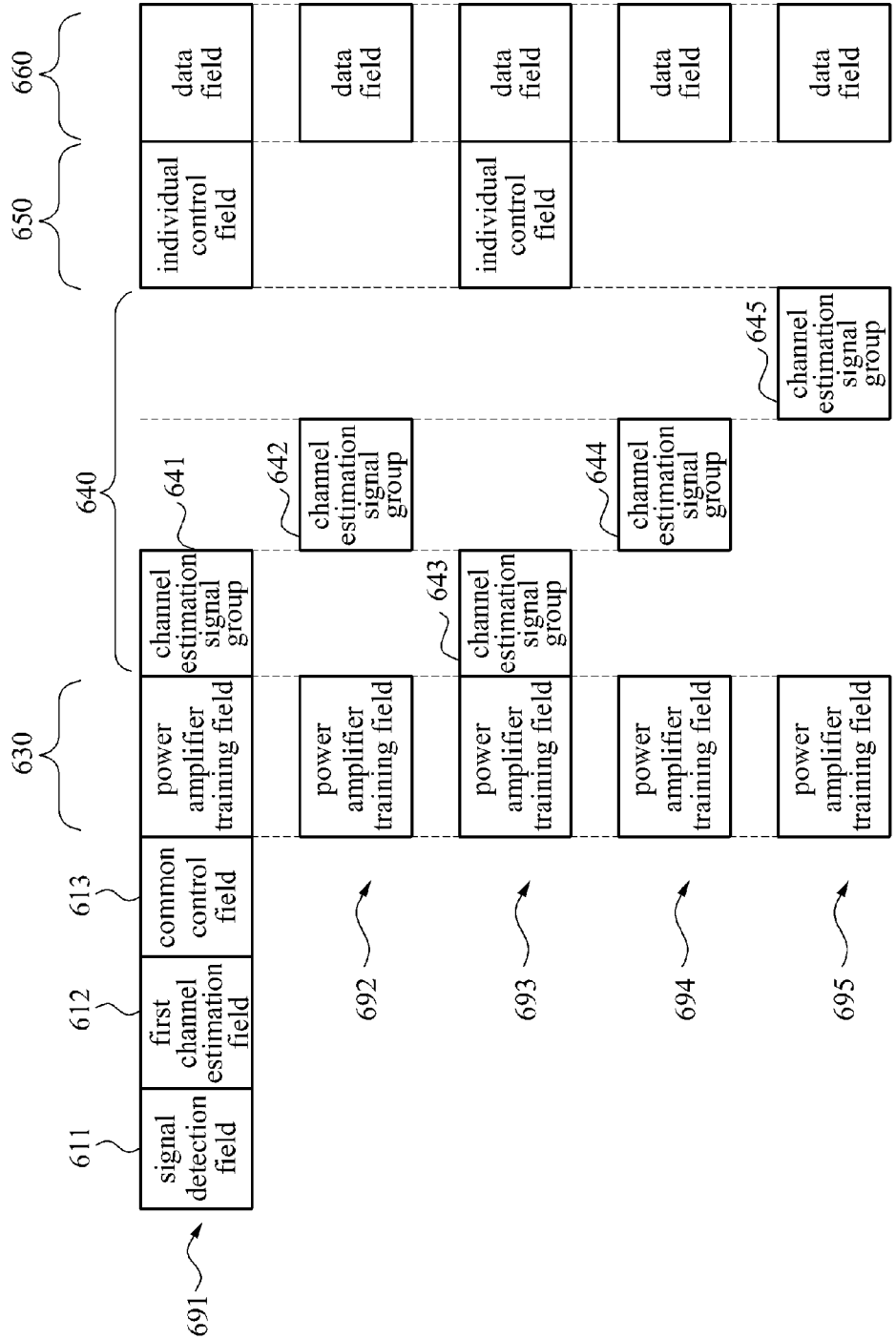
FIG. 6 is a diagram illustrating an example of data streams including channel estimation signal groups in different time intervals with respect to the same terminal according to an embodiment.

FIG. 6 illustrates an example of data streams including channel estimation signal groups in different time intervals with respect to the same terminal according to an embodiment.

Referring to FIG. 6, data streams 691 and 692 are transmitted to a first terminal, and data streams 693, 694, and 695 are transmitted to a second terminal.

Each of the data streams 691, 692, 693, 694, and 695 includes a second channel estimation field 640 to accurately estimate a channel between a transmission apparatus and each of the first terminal and the second terminal. The second channel estimation field 640 may include channel estimation signal groups 641, 642, 643, 644, and 645.

The data streams 691 and 692 include the channel estimation signal groups 641 and 642 in different time intervals, respectively. In the different data streams 691 and 692 transmitted to the first terminal, a time interval of the channel estimation signal group 641 does not overlap a time interval of the channel estimation group 642.

Similarly, in the different data streams 693, 694, and 695 transmitted to the second terminal, time intervals of the channel estimation signal groups 643, 644, and 645 do not overlap each other.

The first terminal may estimate a channel between a transmit antenna and a receive antenna using the channel estimation signal groups 641 and 642. The second terminal may also estimate a channel between a transmit antenna and a receive antenna using the channel estimation signal groups 643, 644, and 645.

A signal detection field 611, a first channel estimation field 612, a common control field 613, a power amplifier training field 630, an individual control field 650, and a data field 660 of FIG. 6 are configured to be similar to the description made above for similar items with reference to FIGS. 2 through 5.

In FIG. 6 two terminals receiving data frames were described. According to another embodiment, a single terminal or at least three terminals may receive data frames. In one example, channel estimation signal groups included in different data streams received by the same terminal may be included in different time intervals, respectively.

Figure 7:
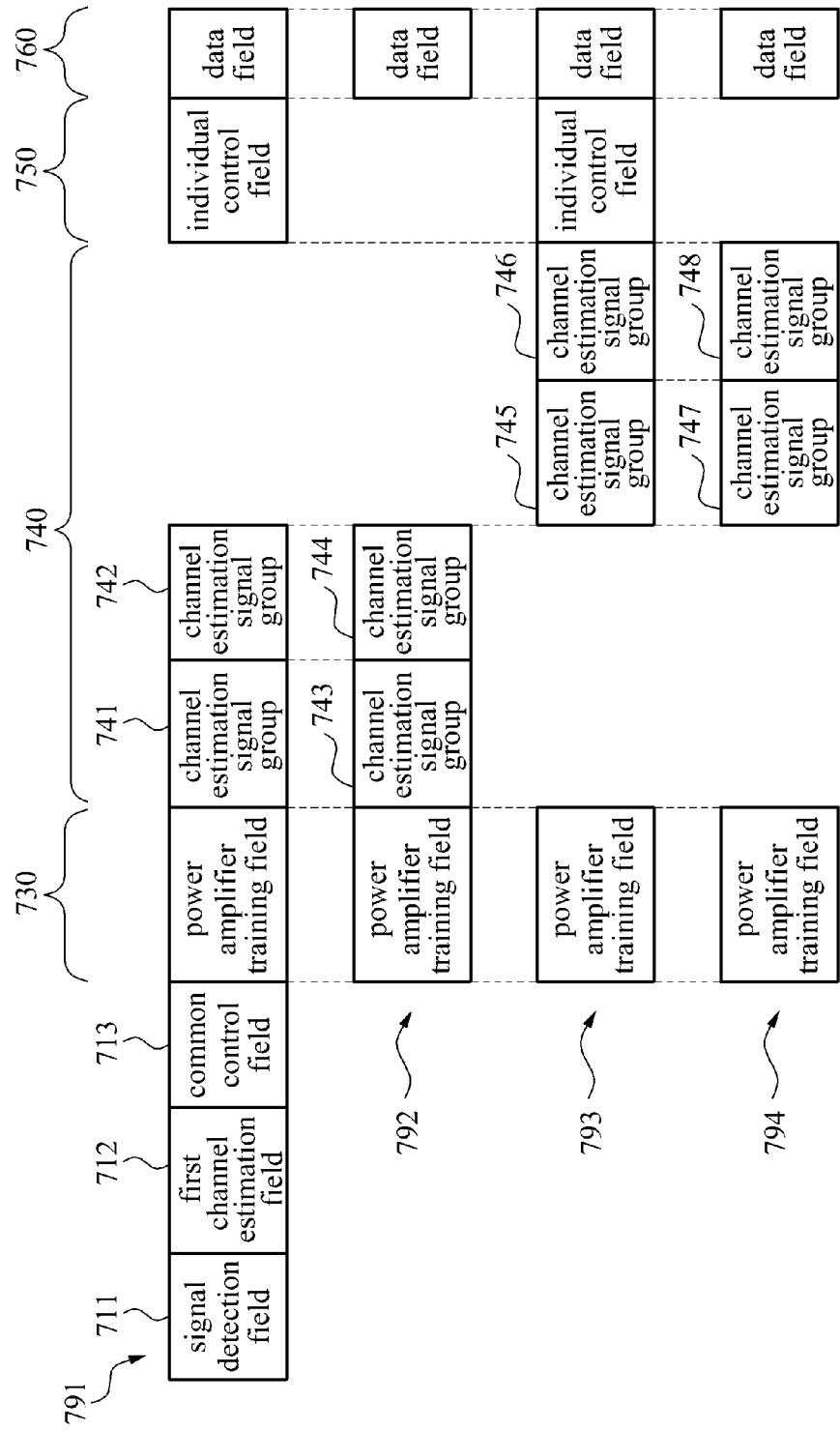
FIG. 7 is a diagram illustrating an example of data streams including channel estimation signal groups in different time intervals with respect to different terminals according to an embodiment.

FIG. 7 illustrates an example of data streams including channel estimation signal groups in different time intervals with respect to different terminals according to an embodiment.

Referring to FIG. 7, data streams 791 and 792 are transmitted to a first terminal, and data streams 793 and 794 are transmitted to a second terminal.

Data streams transmitted to different terminals may include channel estimation signal groups in different time intervals. For example, a first set of channel estimation signal groups 741, 742, 743, and 744 that are included in the data streams 791 and 792 transmitted to the first terminal, and a second set of channel estimation signal groups 745, 746, 747, and 748 that are included in the data streams 793 and 794 transmitted to the second terminal may be included in different time intervals. Accordingly, it is possible to completely remove an interference effect and accurately estimate a channel with respect to different terminals.

Precoded data transmitted to the same terminal may include channel estimation signal groups in the same time interval. In FIG. 7, the first terminal may estimate a channel between a transmit antenna and a receive antenna by combining the first set of channel estimation signal groups 741, 742, 743, and 744. The second terminal may estimate a channel between a transmit antenna and a receive antenna by combining the second set of channel estimation signal groups 745, 746, 747, and 748.

A signal detection field 711, a first channel estimation field 712, a common control field 713, a power amplifier training field 730, an individual control field 750, and a data field 760 of FIG. 7 are configured to be similar to the description made above for similar items with reference to FIG. 2.

In FIG. 7 two terminals receiving data frames were described. According to another embodiment, a single terminal or at least three terminals may receive data frames. In one example, data streams transmitted to different terminals may include channel estimation signal groups in different time intervals.

Figure 8:
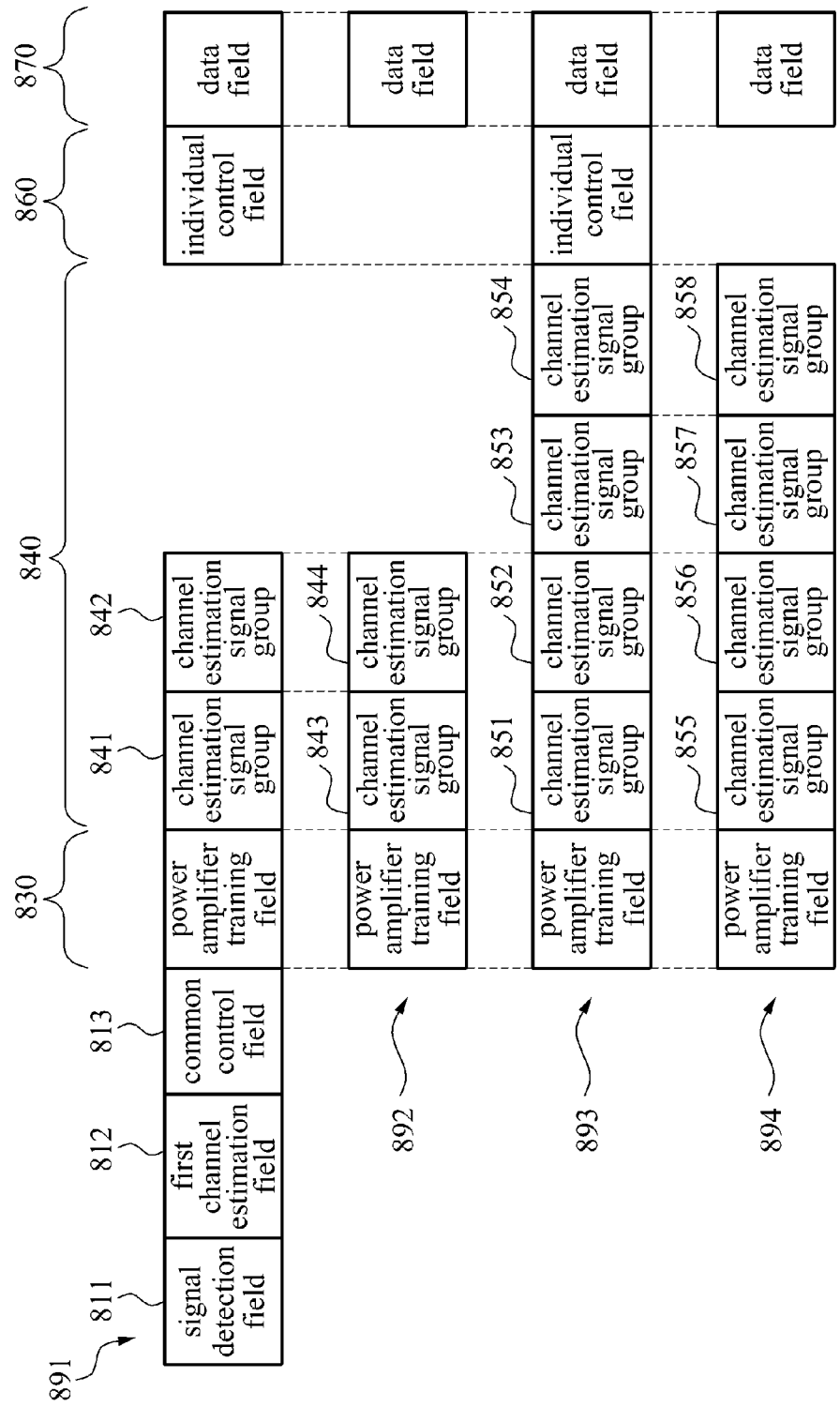
FIG. 8 is a diagram illustrating an example of a data frame in which data streams are independently separated and transmitted using precoding.

FIG. 8 illustrates an example of a data frame in which data stream are independently separated and transmitted using precoding.

Referring to FIG. 8, data streams 891 and 892 may be transmitted to a first terminal, and data streams 893 and 894 may be transmitted to a second terminal.

Each of the data streams 891, 892, 893, and 894 may include a second channel estimation field 840 to estimate a channel between a transmission apparatus and each of the first terminal and the second terminal. The second channel estimation field 840 may include channel estimation signal groups 841, 842, 843, 844, 851, 852, 853, 854, 855, 856, 857, and 858.

The channel estimation signal groups 841, 842, 843, and 844 included in the data streams 891 and 892 transmitted to the first terminal, and the channel estimation signal groups 851, 852, 853, 854, 855, 856, 857, and 858 included in the data streams 893 and 894 transmitted to the second terminal may temporally overlap.

The first terminal may apply an orthogonality to the channel estimation signal groups 841, 842, 843, and 844 by multiplying a unitary matrix and each of the channel estimation signal groups 841, 842, 843, and 844. The second terminal may apply the orthogonality to the channel estimation signal groups 851, 852, 853, 854, 855, 856, 857, and 858 by multiplying a unitary matrix and each of the channel estimation signal groups 851, 852, 853, 854, 855, 856, 857, and 858. Undesirable signals can then be discarded due to the applied orthogonality. Each of the first terminal and the second terminal may estimate a channel between a transmission apparatus and each of the first terminal and the second terminal using the channel estimation signal groups 841, 842, 843, 844, 851, 852, 853, 854, 855, 856, 857, and 858 with the assigned orthogonality.

A signal detection field 811, a first channel estimation field 812, a common control field 813, a power amplifier training field 830, an individual control field 860, and a data field 870 of FIG. 7 are configured to be similar to the description made above for similar items with reference to FIG. 2.

In FIG. 8 two terminals receiving data frames were described. According to another embodiment, a single terminal or at least three terminals may receive data frames. In one example, channel estimation signal groups included in data streams may temporally overlap. Each of the terminals may estimate a channel using a unitary matrix.

Figure 9:
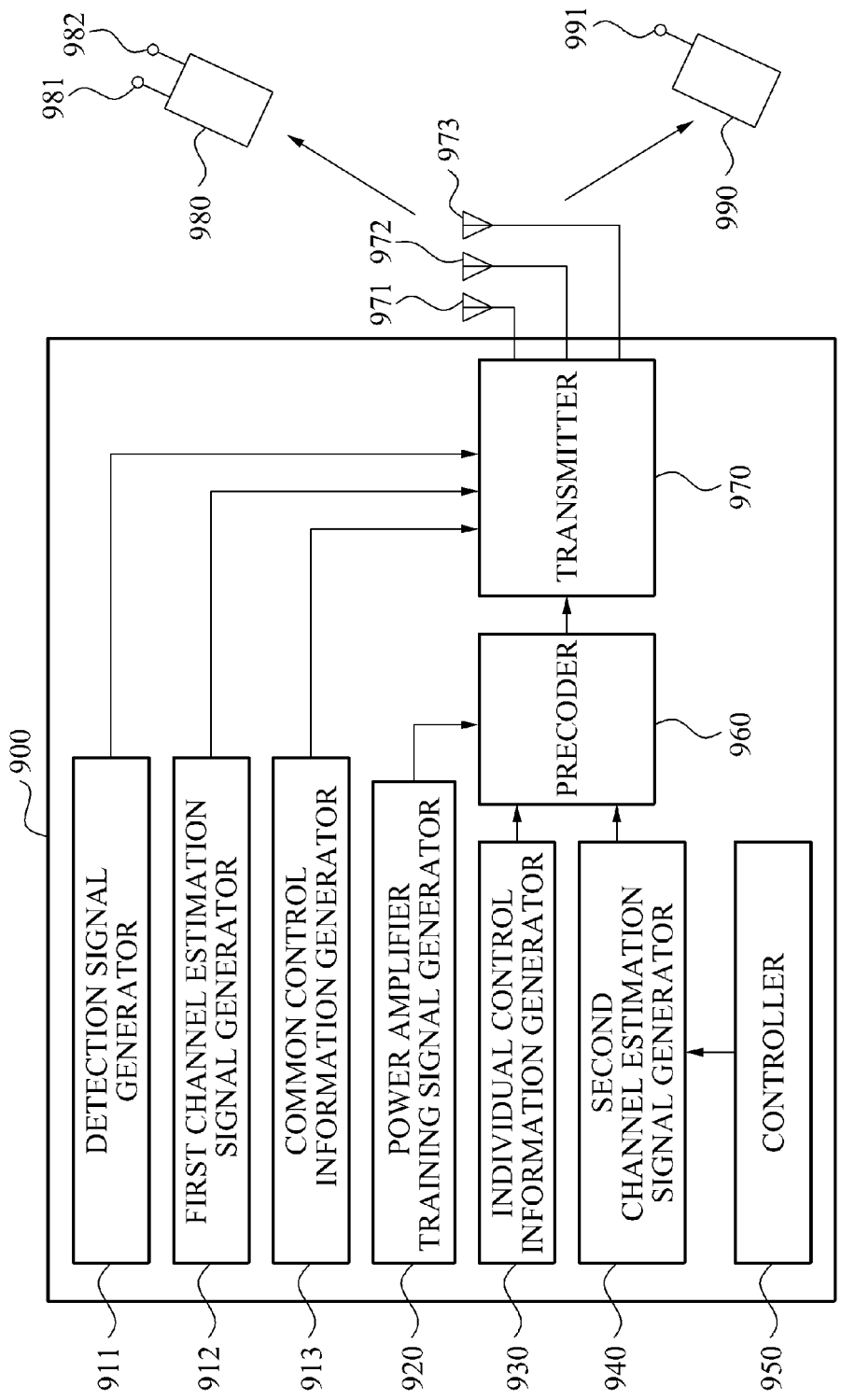
FIG. 9 is a block diagram illustrating a configuration of a transmission apparatus according to an embodiment.

FIG. 9 illustrates a configuration of a transmission apparatus 900 according to an embodiment.

The transmission apparatus 900 may include a detection signal generator 911, a first channel estimation signal generator 912, a common control information generator 913, a power amplifier training signal generator 920, an individual control information generator 930, a second channel estimation signal generator 940, a controller 950, a precoder 960, and a transmitter 970.

The detection signal generator 911 may generate a detection signal. Each of terminals 980 and 990 may detect a data frame transmitted from the transmission apparatus 900, using the detection signal included in the data frame. Each of the terminals 980 and 990 may perform a time synchronization with respect to a current data frame. In addition, each of the terminals 980 and 990 may estimate a coarse frequency offset using the detection signal.

The first channel estimation signal generator 912 may generate a first channel estimation signal. Each of the terminals 980 and 990 may estimate a fine frequency offset based on the first channel estimation signal. In addition, each of the terminals 980 and 990 may receive non-precoded common control information.

The detection signal and the first channel estimation signal are not precoded and are transmitted to each of the terminals 980 and 990.

The common control information generator 913 may generate common control information with respect to the terminals 980 and 990. Each of the terminals 980 and 990 may include at least one receive antenna. For example, the terminal 980 may include receive antennas 981 and 982, and the terminal 990 may include a receive antenna 991.

The "common control information" denotes control information transmitted to all the terminals 980 and 990 included within a coverage of the transmission apparatus 900. The common control information is transmitted without being precoded. The common control information may include information associated with common controls of the data frame. The common control information may include a precoding method applied to the data frame, a number of terminals supported by the data frame, and channel estimation signal groups. The common control information is not precoded with respect to a particular terminal and transmitted to all terminals receiving the data frame.

As described before, a number of data frames included in the data frame, a duration or a length of the second channel estimation field and a format of the second channel estimation field may instead be included in the individual control information to be describe below.

The power amplifier training signal generator 920 may generate a power amplifier training signal. Each of the terminals 980 and 990 may perform a multi-antenna AGC using the power amplifier training signal. The precoder 960 may generate the precoded data by additionally precoding the power amplifier training signal.

The individual control information generator 930 may generate individual control information with respect to each of the terminals 980 and 990. The "individual control information" denotes control information individually determined for each of the terminals 980 and 990. The individual control information may include one or more of: a data field or a data frame transmitted to a corresponding terminal, a modulation and coding method applied to the data field, a bandwidth of a using channel, a channel smoothing, a channel aggregation, an error correction code, a guard interval, and a precoding method applied to the data frame.

As described before, a length of the data field or the data frame transmitted to a corresponding terminal, a modulation and coding method applied to the data field, a channel bandwidth, a channel smoothing, a channel aggregation, an error correction code and a length of a guard interval may instead be included in the common control information.

The second channel estimation signal generator 940 may generate a second channel estimation signal used to estimate a channel for each of multi-accessing terminals 980 and 990. The second channel estimation signal may include at least one channel estimation signal group.

The terminals 980 and 990 may receive a different number of data streams. Each of the data streams may include a channel estimation signal. A number of channel estimation signal groups included in each channel estimation signal may be determined based on a number of data streams received by each of the terminals 980 and 990.

The controller 950 may individually determine a number of data streams transmitted to each of the terminals 980 and 990. The controller 950 may determine a number of training signal groups included in each of the data streams based on the number of data streams. The data frame may include a plurality of data streams. The channel estimation signal may include a plurality of channel estimation signal groups. The transmitter 970 may transmit a plurality of precoded data to a particular terminal included in the plurality of terminals, e.g., either of the terminals 980 and 990. Each of channel estimation signals included in the plurality of precoded data may be included in a different time interval.

The terminal 980 may receive a plurality of data streams. The data streams received by the terminal 980 may include training signal groups in different time intervals, respectively. When the training signal groups do not overlap each other, the terminal 980 may effectively estimate a channel.

An example in which each of the terminals 980 and 990 estimates a channel between the transmission apparatus 900 and each of the terminals 980 and 990 using the channel estimation signal group is described above for similar items with reference to FIGS. 4 through 8.

The precoder 960 may generate precoded data with respect to each of the terminals 980 and 990 by precoding the individual control information and data with respect to each of the terminals 980 and 990. The precoded data may be transmitted to each of the terminals 980 and 990. However, each of the terminals 980 and 990 may decode only precoded data that is precoded with respect to a corresponding terminal.

The precoder 960 may generate the precoded data by additionally precoding the power amplifier training signal and the second channel estimation signal.

The transmitter 970 may transmit, to the terminals 980 and 990, a data frame including a plurality of data streams. The transmitter 970 may transmit, to the terminals 980 and 990, a data frame including the common control information and the precoded data according to a multi-user multiple input multiple output (MU-MIMO) communication method. The transmitter 970 may transmit the data frame to each of the terminals 980 and 990 using a plurality of transmit antennas 971, 972, and 973. Each data stream may include a detection signal, a first channel estimation signal, and common control information that are not precoded, and precoded data that is precoded with respect to each of the terminals 980 and 990.

Each of the terminals 980 and 990 may decode the non-precoded common control information and may also decode the precoded data precoded with respect to a corresponding terminal.

Data included in the precoded data may be modulated by selecting a single modulation method from various modulation methods based on a channel status. For example, the individual control information may be modulated using a predetermined modulation method. The data may also be error correction coded by selecting a single error correction code method from various error correction code methods. For example, the individual control information may be error correction coded using a predetermined error correction code method. The modulation method and the error correction code method applied to the data may be included in the individual control information.

The individual control information may be modulated using a modulation method predetermined between the transmission apparatus 900 and each of the terminals 980 and 990, or may be error correction coded using an error correction code method predetermined between the transmission apparatus 900 and each of the terminals 980 and 990. For example, the terminals 980 and 990 may simply decode the individual control information without reference to other control information, and may decode data using the decoded individual control information.

The modulation method or the error correction code method applied to the individual control information may be included in the common control information.

Figure 10:
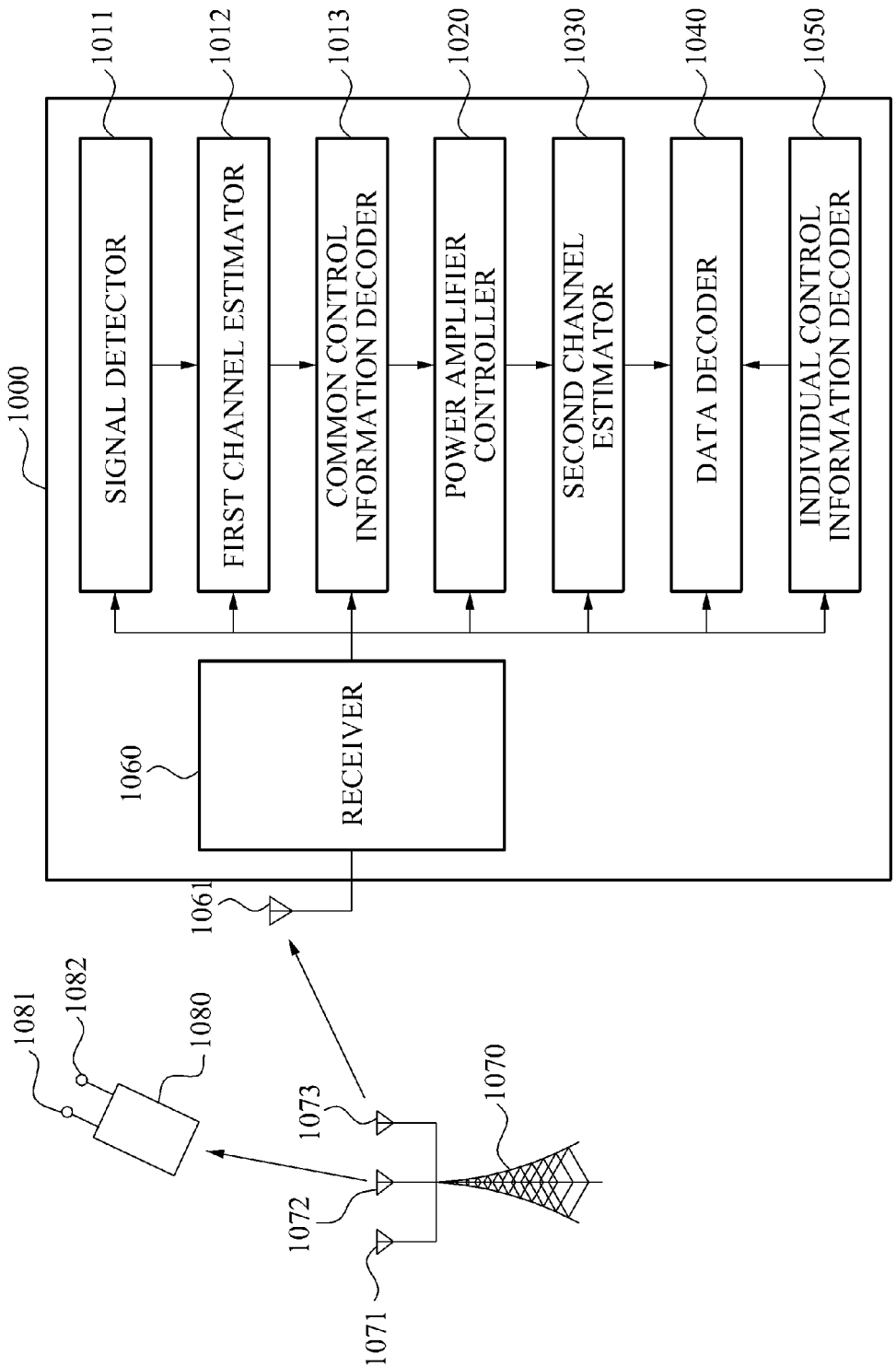
FIG. 10 is a block diagram illustrating a configuration of a terminal according to an embodiment.

FIG. 10 illustrates a configuration of a terminal according to an embodiment.

The terminal 1000 may include a receiver 1060, a signal detector 1011, a first channel estimator 1012, a common control information decoder 1013, a power amplifier controller 1020, a second channel estimator 1030, a data decoder 1040, and an individual control information decoder 1050.

The receiver 1060 may receive a data frame from a transmission apparatus 1070. The data frame may include a data stream or a plurality of data streams. The data stream may include a signal detection field, a first channel estimation field, a common control field, and precoded data. The transmission apparatus 1070 may transmit the precoded data using a plurality of transmit antennas 1071, 1072, and 1073.

The signal detector 1011 may detect a signal transmitted from the transmission apparatus 1070. The signal may be detected using a detection signal included in the signal detection field. The signal detector 1011 may perform a coarse AGC using the detection signal, and may also estimate a coarse frequency offset. The signal detector 1011 may perform a time synchronization with respect to a current data frame using the detection signal.

The first channel estimator 1012 may estimate a fine frequency offset using a first channel estimation signal included in the first channel estimation field. The first channel estimator 1012 may estimate a channel between the transmission apparatus 1070 and the terminal 1000 in order to decode common control information.

The common control information decoder 1013 may decode the common control information from the data frame.

The "common control information" denotes control information decodable by the terminal 1000 and by a terminal 1080 included within a coverage of the transmission apparatus 1070. The common control information may include the data frame transmitted to the terminals 1000 and 1080. The common control information may include one or more of: a precoding method applied to the data frame, a number of terminals supported by the data frame, a number of data streams included in the data frame, and an interval or a length of a second channel estimation field, and a format of the second channel estimation field. As described before, a number of data frames included in the data frame, a duration or a length of the second channel estimation field and a format of the second channel estimation field may instead be included in the individual control information. The common control information is transmitted without being precoded with respect to a particular terminal.

The power amplifier controller 1020 may accurately control a gain of a power amplifier using the power amplifier training signal included in the power amplifier training field.

The second channel estimator 1030 may estimate a channel between the transmission apparatus 1070 and the terminal 1000 using the second channel estimation signal included in the second channel estimation field. The second channel estimation signal may include at least one channel estimation signal group.

The terminal 1000 may receive a plurality of data streams. According to an example embodiment, a number of channel estimation signal groups included in each of the data streams received by the terminal 1000 may be determined based on a number of the data streams received by the terminal 1000.

According to another example embodiment, channel estimation signals included in the data streams received by the first terminal 1000 may be included in different time intervals.

An example in which the terminal 1000 estimates a channel between the terminal 1000 and the transmission apparatus 1070 using the channel estimation signal group is described above for similar items with reference to FIGS. 4 through 8.

The individual control information decoder 1050 may decode the individual control information based on the common control information and a channel estimation result of the second channel estimator 1030. The "individual control information" denotes control information individually determined with respect to each of the terminals 1000 and 1080. The individual control information may include one or more of: a length of a data field or a data frame transmitted to a corresponding terminal, a modulation and coding method applied to the data field, a channel bandwidth, a channel smoothing, a channel aggregation, an error correction code, a length of a guard interval, and a precoding method applied to the data frame. As described before, a length of the data field or the data frame transmitted to a corresponding terminal, a modulation and coding method applied to the data field, a channel bandwidth, a channel smoothing, a channel aggregation, an error correction code and a length of a guard interval may instead be included in the common control information.

The data decoder 1040 may decode data included in a data stream, based on the individual control information and a channel estimation result of the second channel estimator 1030. A modulation method selected from various modulation methods or an error correction code method selected from various error correction code methods may be applicable to the data transmitted to each of the terminals 1000 and 1080, based on a channel status.

A modulation method or an error correction code method predetermined between the terminal 100 and the transmission apparatus 1070 may be applicable to the individual control information. In one example, the terminal 1000 may simply decode the individual control information without reference to other control information, and may decode data using the decoded individual control information.

The transmission apparatus 1070 may precode and transmit individual control information and data determined with respect to each of the terminals 1000 and 1080.

Figure 11:
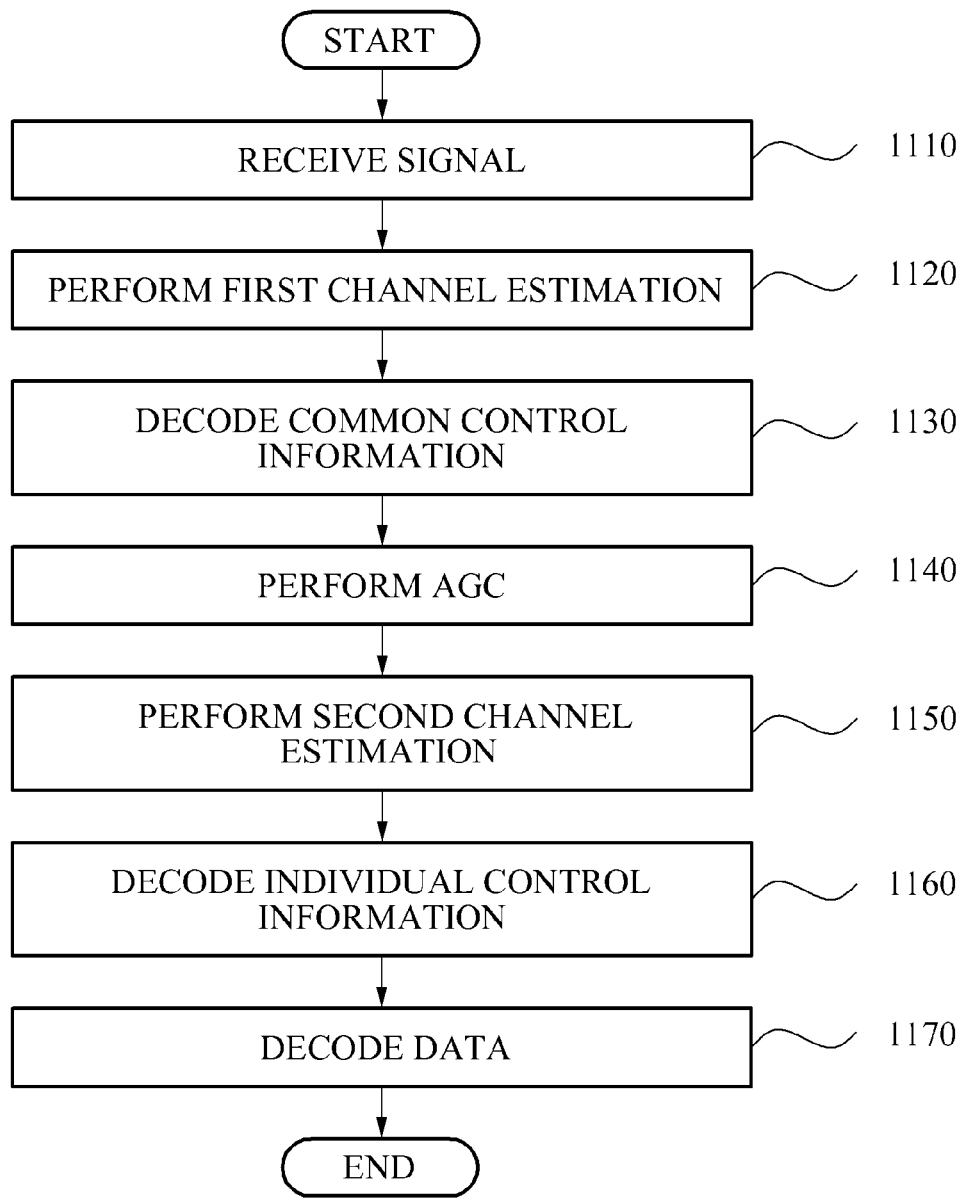
FIG. 11 is a flowchart illustrating a method of receiving data according to an embodiment.

FIG. 11 illustrates a method of receiving data according to an embodiment.

In operation 1110, a terminal may receive a data frame from a transmission apparatus. The terminal may detect the data frame using a detection signal included in the data frame. The terminal may perform a coarse AGC using the detection signal. The terminal may perform a time synchronization with respect to the current data frame using the detection signal.

In operation 1120, the terminal may perform a first channel estimation using a first channel estimation signal included in the data frame. The "first channel estimation" denotes an operation of estimating a channel between the transmission apparatus and the terminal in order to decode a non-precoded field included in the data frame. Also, in operation 1120, the terminal may estimate a fine frequency offset using the first channel estimation signal.

In operation 1130, the terminal may decode common control information included in the data frame. The terminal may decode precoded data included in the data frame, based on the common control information.

In operation 1140, the terminal may perform a fine AGC using a power amplifier training signal included in the data frame.

In operation 1150, the terminal may perform a second channel estimation using the second channel estimation field included in the data frame. The "second channel estimation"

denotes an operation of estimating a channel between the transmission apparatus and the terminal in order to decode precoded data.

In operation 1160, the terminal may decode the individual control information included in the data frame.

In operation 1170, the terminal may decode data included in the data frame, based on a second channel estimation result and the individual control information.

Figure 12:
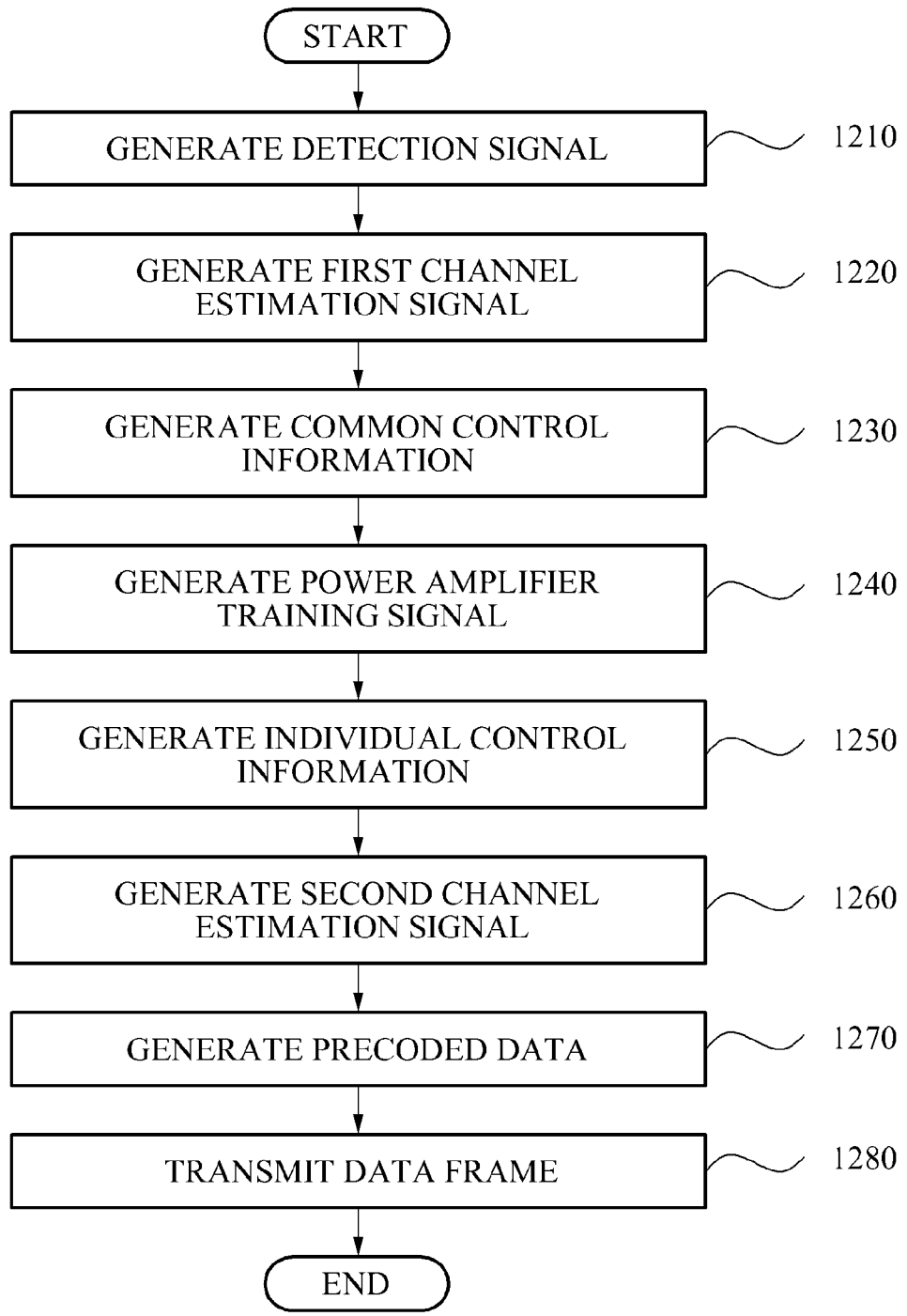
FIG. 12 is a flowchart illustrating a method of transmitting data according to an embodiment.

FIG. 12 illustrates a method of transmitting data according to an embodiment.

In operation 1210, a transmission apparatus may generate a detection signal. A terminal may detect a data frame transmitted from the transmission apparatus, using the detection signal included in the data frame, and may perform a coarse frequency offset. The terminal may perform a time synchronization with respect to the current data frame using the detection signal.

In operation 1220, the transmission apparatus may generate a first channel estimation signal. The terminal may estimate a channel between the transmission apparatus and the terminal based on the first channel estimation signal, and may decode non-precoded information or non-precoded signals using the above estimation result.

In operation 1230, the transmission apparatus may generate common control information. The common control information may include control information associated with the data frame transmitted from the transmission apparatus.

In operation 1240, the transmission apparatus may generate a power amplifier training signal. The terminal may perform a fine AGC using the power amplifier training signal.

In operation 1250, the transmission apparatus may generate individual control information. The "individual control information" denotes control information individually determined with respect to each terminal.

In operation 1260, the transmission apparatus may generate a second channel estimation signal. The terminal may estimate a channel between the transmission apparatus and the terminal using the second channel estimation signal, and may decode a precoded signal or precoded information using the above estimation result.

The second channel estimation signal may include a plurality of training signal groups. A number of channel estimation signal groups included in the second channel estimation signal may be determined based on a number of data streams received by the terminal.

The channel estimation signal groups included in the second channel estimation signal may be included in different time intervals.

In operation 1270, the transmission apparatus may generate precoded data by precoding the data individual control information and data with respect to each terminal. The transmission apparatus may generate the precoded data by additionally precoding the power amplifier training signal and the second channel estimation signal.

In operation 1280, the transmission apparatus may transmit, to a plurality of terminals, common control information and the precoded data. The data frame may include the detection signal and the first channel estimation signal. The transmission apparatus may transmit the data frame using a MU-MIMO communication method. In one example, the common control information may include information associated with a number of terminals supported by the MU-MIMO communication method.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files including higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, and devices such as a desktop PC, a high definition television (HDTV), an optical disc player, a setup and/or set-top box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission apparatus to transmit data, comprising common control information, individual control information, and a data field, to terminals comprising at least one receive antenna, the transmission apparatus comprising:

a common control information generator configured to generate the common control information with respect to the terminals;

an individual control information generator configured to generate the individual control information with respect to each of the terminals;

a precoder configured to generate precoded data with respect to each of the terminals by precoding the individual control information and the data field with respect to each of the terminals;

a transmitter configured to transmit, to the terminals, a data frame comprising the common control information and the precoded data according to a multi-user multiple input multiple output (MU-MIMO) communication method, and a power amplifier training signal generator configured to generate a power amplifier training signal for a multi-antenna automatic gain control (AGC) of each of the terminals, wherein the precoder is further configured to generate the precoded data by additionally precoding the power amplifier training signal.

2. The transmission apparatus of claim 1, wherein the common control information comprises one or more of: a precoding method applied to the data frame, a number of terminals supported by the data frame, a number of data streams included in the data frame, a duration or a length of a channel estimation field included in the data frame, and a format of the channel estimation field.

3. The transmission apparatus of claim 1, wherein the individual control information comprises one or more of: a length of the data frame, a modulation and coding method applied to the data with respect to each of the terminals, a channel bandwidth, a channel smoothing, a channel aggregation, an error correction code, and a length of a guard interval.

4. The transmission apparatus of claim 1, further comprising:

a channel estimation signal generator configured to generate a channel estimation signal used for a channel estimation of each of the terminals, wherein the precoder is further configured to generate the precoded data by additionally precoding the channel estimation signal.

5. The transmission apparatus of claim 4, further comprising:

a controller configured to:

individually determine a number of data streams transmitted to each of the terminals; and determine a number of channel estimation signal groups based on the number of data streams, wherein the data frame comprises a plurality of data streams, and wherein the channel estimation signal comprises a plurality of channel estimation signal groups.

6. The transmission apparatus of claim 4, wherein:

the transmitter is further configured to transmit a plurality of precoded data to a particular terminal included in the plurality of terminals; and each of channel estimation signals included in the plurality of precoded data is included in a different time interval.

7. The transmission apparatus of claim 1, wherein the individual control information is modulated using a predetermined modulation method, or is error correction coded using a predetermined error correction code method.

8. A terminal wirelessly connected to a transmission apparatus, the terminal comprising:

a receiver configured to receive a data frame from the transmission apparatus;

a common control information decoder configured to decode, from the data frame, common control information commonly transmitted to the terminal and to another terminal wirelessly connected to the transmission apparatus;

an individual control information decoder configured to decode, from the data frame, individual control information individually determined with respect to the terminal using the common control information; and a data decoder configured to decode data, included in the data frame, based on the individual control information, wherein the individual control information and the data are precoded.

9. The terminal of claim 8, wherein the common control information comprises one or more of: a precoding method applied to the data frame, a number of terminals supported by the data frame, a number of data streams included in the data frame, a duration or a length of a channel estimation field included in the data frame, and a format of the channel estimation field.

10. The terminal of claim 8, wherein the individual control information comprises one or more of: a length of the data frame, a modulation and coding method applied to the data with respect to each of the terminals, a channel bandwidth, a channel smoothing, a channel aggregation, an error correction code, and a length of a guard interval.

11. The terminal of claim 8, wherein the individual control information decoder is further configured to decode the individual control information using a predetermined modulation method or a predetermined error correction code method.

12. The terminal of claim 8, further comprising:

a channel estimator configured to estimate a channel between the terminal and the transmission apparatus based on a channel estimation signal, wherein the data frame comprises the channel estimation signal, and wherein the data decoder is further configured to decode the data based on the estimated channel.

13. The terminal of claim 12, wherein:

the data frame comprises a plurality of data streams;

each of the data streams comprises the channel estimation signal; and the channel estimation signal included in each of the data streams is included in a different time interval.

14. The terminal of claim 12, wherein:

the data frame comprises a plurality of data streams;

the channel estimation signal comprises a plurality of channel estimation signal groups; and a number of the channel estimation signal groups is determined based on a number of the data streams.

15. The terminal of claim 8, wherein the receiver is further configured to receive the data frame via at least one receive antenna.

16. A method of transmitting data, comprising common control information, individual control information, and a data field, to terminals comprising at least one receive antenna, the method comprising:

generating the common control information with respect to the terminals;

generating the individual control information with respect to each of the terminals;

generating precoded data with respect to each of the terminals by precoding the individual control information and the data field with respect to each of the terminals;

transmitting, to the plurality of terminals, a data frame comprising the common control information and the precoded data according to a multi-user multiple input multiple output (MU-MIMO) communication method; and generating a channel estimation signal used for a channel estimation of each of the terminals, wherein the precoding comprises generating the precoded data by additionally precoding the channel estimation signal.

17. The method of claim 16, wherein the common control information comprises one or more of: a precoding method applied to the data frame, a number of terminals supported by the data frame, a number of data streams included in the data frame, a duration or a length of a channel estimation field included in the data frame, and a format of the channel estimation field.

18. The method of claim 16, wherein the individual control information comprises one or more of: a length of the data frame, a modulation and coding method applied to the data with respect to each of the terminals, a channel bandwidth, a channel smoothing, a channel aggregation, an error correction code, and a length of a guard interval.

19. A method of receiving data, the method comprising:
receiving a data frame from a transmission apparatus;
decoding, from the data frame, common control information commonly transmitted to terminals wirelessly connected to the transmission apparatus;
decoding, from the data frame, individual control information individually determined with respect to one of the terminals using the common control information; and
decoding data, included in the data frame, based on the individual control information,
wherein the individual control information and the data are precoded.

20. The method of claim 19, further comprising:
estimating a channel between one of the terminals and the transmission apparatus based on a channel estimation signal,
wherein the data frame comprises the channel estimation signal, and the decoding of the data comprises decoding the data based on the estimated channel.

21. The method of claim 19, wherein:
the data frame comprises a plurality of data streams;
each of the data streams comprises a channel estimation signal; and
the channel estimation signal included in each of the data streams is included in a different time interval.

22. A non-transitory computer-readable recording medium storing a program to implement the method of claim 16.

23. The transmission apparatus of claim 1, further comprising:
a channel estimation signal generator configured to generate a channel estimation signal used for a channel estimation of each of the terminals.

24. The transmission apparatus of claim 1, wherein the common control information comprises information that is required for decoding one or a combination of the data field and the individual control information.

25. The transmission apparatus of claim 1, wherein the data field comprises an audible message signal.

* * * * *